United States Patent

[11] 3,582,150

| [72] | Inventors | William J. Williams<br>Ashtabula;<br>Richard L. Powers, Conneant, both of,<br>Ohio |
|---|---|---|
| [21] | Appl. No. | 876,154 |
| [22] | Filed | Dec. 4, 1969 |
| [45] | Patented | June 1, 1971 |
| [73] | Assignee | Rockwell-Standard Company<br>Pittsburgh, Pa.<br>Continuation of application Ser. No.<br>719,484, Apr. 8, 1968, now abandoned.<br>This application Dec. 4, 1969, Ser. No.<br>876,154 |

[54] BRAKE SYSTEM
12 Claims, 1 Drawing Fig.

[52] U.S. Cl. ..................................................... 303/9,
188/106P, 303/2, 303/10, 303/13
[51] Int. Cl. ..................................................... B60t 13/20,
B60t 13/04
[50] Field of Search ........................................ 188/106,
106 P; 303/2, 3, 9, 10, 13, 14, 18—19, 52—54

[56] References Cited
UNITED STATES PATENTS

| 2,065,259 | 12/1936 | Ball et al. | 188/151 |
| 2,270,431 | 1/1942 | Freeman | 188/170 |
| 2,834,438 | 5/1958 | Riddle et al. | 188/358 |
| 3,276,551 | 10/1966 | Buletti et al. | 188/332 |
| 3,285,672 | 11/1966 | Avrea | 303/79 |
| 3,309,149 | 3/1967 | Bueler | 303/13 |
| 3,385,636 | 5/1968 | Cruse | 303/13 |
| 3,443,839 | 5/1969 | Hinrichs et al. | 303/9X |

FOREIGN PATENTS

| 929,106 | 6/1963 | Great Britain | |

*Primary Examiner*—Trygve M. Blix
*Assistant Examiner*—John J. McLaughlin

ABSTRACT: A service and auxiliary brake system having a service line in which the pressure selectively is developed and relieved to actuate and relieve the brakes and an auxiliary line in which the pressure normally is maintained within a predetermined range independently of the service line pressurization to maintain auxiliary mechanically powered brake actuators inoperative and from which the pressure can be selectively or automatically relieved to permit operation of the auxiliary actuators.

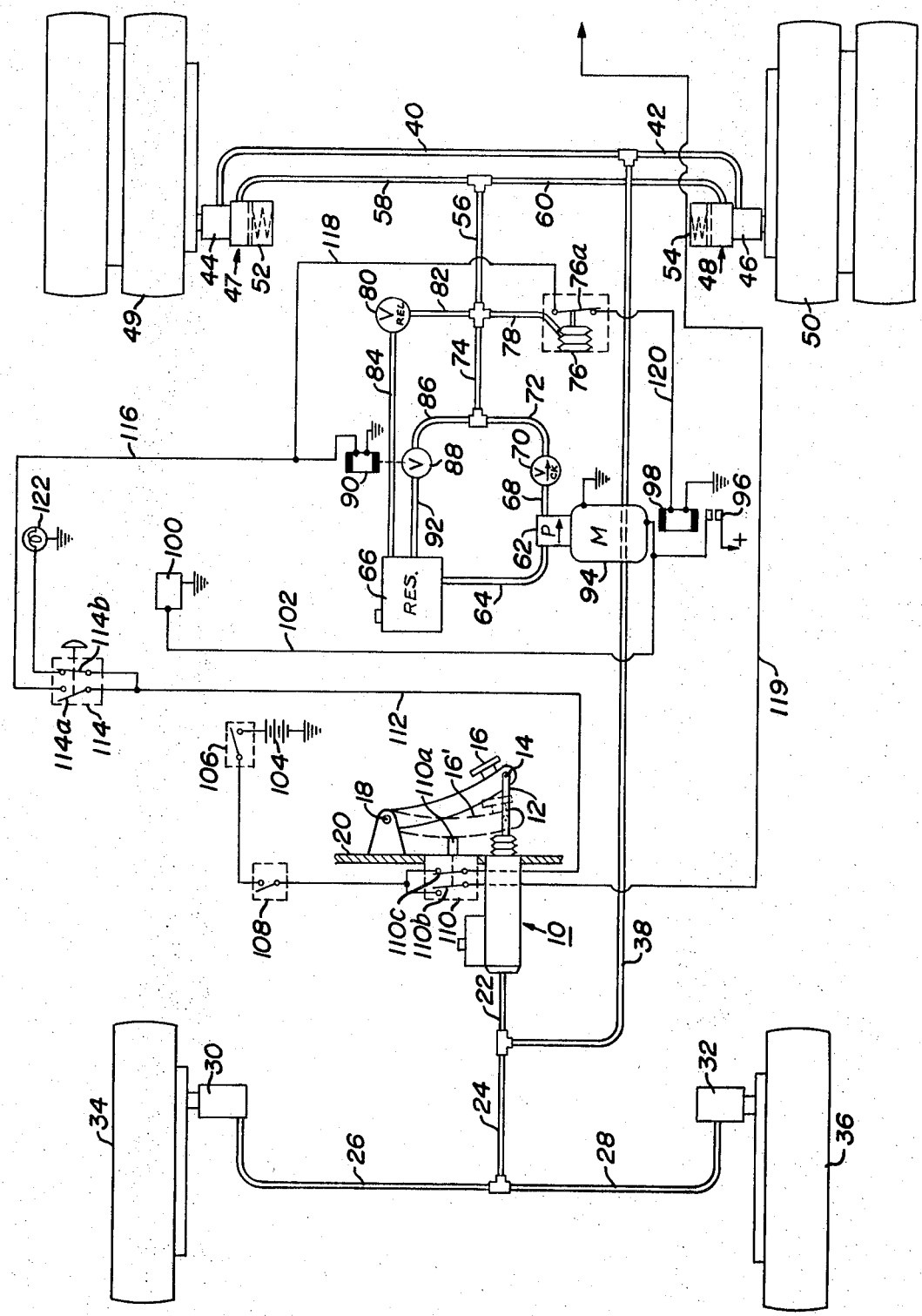

BRAKE SYSTEM

This application is a continuation of U.S. Pat. application Ser. No. 719,484, filed Apr. 8, 1968, now abandoned.

BACKGROUND OF THE INVENTION

This invention is an improvement upon existing combined service and auxiliary hydraulic brake systems of which that disclosed in U.S. Pat. No. 3,232,175, issued Feb. 1, 1966, to F. T. Cox, Jr., et al., for brake systems is illustrative.

The system of the present invention incorporates into one unit the following important novel features:
1. Automatic application of the auxiliary brake units when the ignition switch is turned off or the engine otherwise becomes inoperative;
2. Manual application of the auxiliary brake units when the ignition switch is on; and
3. Automatic application of the auxiliary brake units by the service brake pedal if there is a failure or loss of fluid in the service system.

The auxiliary system is completely independent of the service system. The auxiliary system components can be placed anywhere on the vehicle. They can even be utilized on towed vehicles merely requiring an electrical connection between the towed vehicle and the towing vehicle. In the event of failure of the service system, the vehicle can be driven under brake control of the auxiliary system, since depression of the pedal will actuate the auxiliary system to energize the brakes but release of the pedal will restore the pressure in the auxiliary system, thereby deenergizing the brakes and permitting the vehicle to move.

To provide an improved brake system which jointly or severally embodies these features is the basic object of this invention.

These and other objects of the present invention will become more fully apparent by reference to the appended claims and as the following detailed description proceeds in reference to the accompanying drawing.

DESCRIPTION OF DRAWING

The single FIGURE is a diagrammatical illustration of the brake system of the present invention.

DETAILED DESCRIPTION

Referring now in detail to the drawing, there is there illustrated diagrammatically a vehicle having a generally conventional service brake system including a master cylinder 10 having an input piston rod 12 connected at 14 for operation by a brake pedal 16 pivoted as at 18 to the body 20 of the vehicle. The outlet conduit 22 from the master cylinder 10 is connected by conduits 24, 26 and 28 to the conventional hydraulic actuators 30 and 32 for the brakes of the front wheels 34 and 36 and via the conduits 38, 40 and 42 to the service actuator portions 44 and 46 of the combined actuators 47 and 48 for the brakes of the rear wheels 49 and 50. The combined actuators 47 and 48 for the rear wheels 49 and 50 may be of the type illustrated in the aforesaid U.S. Pat. No. 3,232,175 but are preferably of the form illustrated in copending U.S. Application Ser. No. 678,279, filed Oct. 26, 1967 for "Brake Actuator" by Frank T. Cox, Jr., et al., to which reference is made in the event more detailed information with respect to the construction of these combined actuators is deemed desirable. The front and rear wheel brakes are preferably of the construction shown in U.S. Pat. No. 3,037,584, issued June 5, 1962, to F. T. Cox, et al., for Wedge Actuated Brake Assembly.

The auxiliary actuator portions 52 and 54 for the brakes of wheels 49 and 50 are spring powered elements normally maintained inoperative by hydraulic pressure applied thereto by an auxiliary hydraulic line or system formed by conduits 56, 58 and 60. Hydraulic pressure is normally maintained within this auxiliary system by a pump 62 having its inlet 64 connected to a hydraulic fluid reservoir 66 and its outlet 68 connected through a check valve 70 and conduits 72 and 74 to the conduit 56 of the auxiliary system. The pressure supplied to the conduit 56 is sensed by a pressure responsive electric switch 76 having its fluid input via conduit 78. Switch 76, in one preferred embodiment, is set to close when the pressure in conduit 78 reaches a low of 400 lbs. p.s.i. and to open when it reaches a maximum pressure of 500 lbs. p.s.i. As will be explained presently, switch 76 is in the control circuit for the motor driving pump 62.

A pressure relief valve 80 has its inlet connected to the juncture of conduits 74 and 56 via a conduit 82 and its outlet connected to the reservoir 66 via a conduit 84. The pressure relief valve 80 is set to open at 600 p.s.i. in the preferred embodiment to prevent excessive build up in pressure in the auxiliary system in the event of the failure of the pressure switch 76 to open and terminate operation of pump 62 at the proper pressure. This valve will also relive any pressure increase due to temperature increases.

A bypass connection is provided from the juncture of connection of conduits 72 and 74 to the reservoir 66 via conduits 86, valve 88 (operated under control of a solenoid 90) and conduit 92. Valve 88 is normally spring biased to its open position but is closed upon energization of the solenoid 90. The control circuit for solenoid 90 will be described presently.

The direct current motor 94 which drives pump 62 is controlled by the normally open contacts 96 of motor control relay 98. One of the contacts 96 is connected to a source of potential as indicated (one terminal of the vehicle battery) and the other of the contacts 96 is connected to one of the terminals of the motor 94. The other terminal of the motor 94 is grounded. The ungrounded terminal of the motor 94 is also connected to a terminal of a warning buzzer 100 by an electrical lead 102. The other terminal of the buzzer is grounded as indicated. Thus, whenever relay 98 is energized, motor 94 drives pump 62 and there is an audible indication to the vehicle operator by operation of the buzzer 100 that the pump 62 is operating.

An electrical control for solenoid 90 and motor control relay 98 circuit is provided from ground, through the vehicle battery 104, an ignition key operated switch 106, a vacuum operated switch 108 (connected to sense the inlet manifold pressure of the vehicle engine), a pushbutton operated normally closed 110, lead 112, the normally open contact 114a of the manually actuated double pole switch 114 and electrical lead 116 to solenoid coil 90. The other side of coil 90 is grounded.

When the operator wishes to move the vehicle, he operates his ignition key to close the ignition-operated switch 106. By a separate ignition operated switch (not shown), the circuit to the starter motor is simultaneously closed to start the vehicle's engine. When the engine is started and the vacuum developed in the inlet manifold of the engine, the switch 108 will also close. In the preferred embodiment, this is set to close at a minimum vacuum of eight inches of mercury. Since switch 110 is normally closed, this completes the circuit from the battery 104 to the switch 114. The operator then shifts the switch 114 to close the circuit from the lead 112 to the lead 116 to thereby energize the solenoid 90 and close the valve 88. This prevents fluid from passing to the reservoir 66 via the conduits 86 and 92.

Simultaneously with energization of the solenoid 90, a circuit is completed from the battery 104 through the same circuit to lead 116 and through the lead 118, the normally closed contacts 76a of the pressure sensitive switch 76 and the lead 120 to the motor control relay 98. Energization of the relay 98 closes the contacts 96 and starts the motor 94 operating the pump 62. The motor 94 will continue to operate and drive the pump 62 until the pressure in the conduits 74 and 56 reaches the cutoff pressure as determined by the setting of pressure sensitive switch 76, in the preferred embodiment 500 lbs. p.s.i. When it reaches this pressure, the switch 76 will open its contact 76a, deenergize the relay 98 and stop motor 94. Check valve 70 prevents return fluid flow through pump 62.

With the pressure thus developed in the auxiliary brake line as defined by conduits 74, 56, 58 and 60, the mechanically powered brake actuators sections 52 and 54 are maintained inoperative by hydraulic pressure. The control of the brakes is thus entirely under control of the normal service brake system as previously described.

With this arrangement, if the vehicle operator wishes to utilize the auxiliary system apply the brakes of the rear wheels 49 and 50 while allowing his engine to run, he may do so by manual operation of the switch 114, to open the contacts 114a. This will deenergize the solenoid 90 to open the valve 88 and relieve the pressure on the conduits 74, 56, 58 and 60 and prevent operation of the motor 94 to operate the pump 62 restore that pressure. With the pressure in the auxiliary system thus relieved the mechanically powered portions of the actuators 52 and 54 will operate to energize the brakes for the wheels 49 and 50. When the operator wishes to disengage the brakes, he merely shifts the switch 114 to close the contacts 114a. This will energize the solenoid 90 to close the valve 88 and permit the motor 94 to operate under control of the relay 98 to restore the pressure within the system. The contacts 114b of the switch 114 close when the contacts 114a open to energize an indicator lamp 122 to indicate to the operator that his brakes are on.

Similarly, if the vehicle operator stops his vehicle with a normal service brake system and turns off the ignition, switch 106 will be open to deenergize solenoid 90 and prevent operation of the motor 94, thus relieving the pressure within the auxiliary system and allowing the auxiliary actuations 52 and 54 to energize the brake. Similarly, if the engine stops running, vacuum switch 108 will open with the same result.

As indicated previously, the auxiliary brake system is automatically actuated in the event of failure of the service brake system. So long as the service brake system is functioning normally, the pedal 16 has a limit of travel in the brake actuating direction indicated by the dotted line 16' which is short of the pushbutton 110a for the switch 110. If there is loss of fluid in the service system, the piston rod 12 can move beyond its normal limit permitting the pedal 16 to travel to a position to engage the pushbutton 110a to open the contact 110c and close contact 110b of the switch 110. Opening of the contact 110c contacts breaks the circuit to the solenoid 90 and the motor control relay 98 thereby relieving pressure within the auxiliary system and permitting the spring powered actuators to energize the brakes for the wheels 49 and 50. Closing contact 110b closes the circuit from the battery to the existing stop light circuit of the vehicle through line 119.

It will be noted that with this system the auxiliary system is completely independent of the normal service system but immediately senses any failure of the service system to properly operate and is thereafter automatically operative to apply the brakes. In this system, there is no possibility that the auxiliary system will operate to apply the brakes when the operator is not expecting to apply the brakes. They are applied only when he deliberately operates switch 114, when he turns off the ignition, or when he attempts to apply the service system and it is inoperative.

Since the auxiliary system is independent of the service system, it is possible to control the vehicle solely by the use of the auxiliary system if such should be necessary to permit the vehicle to be moved from the point at which failure of the service system is first detected to a service facility or to a location in which the vehicle will not obstruct traffic. The pump 62 has sufficient capacity, one gallon per minute in one practical form of the the invention, to deactivate the auxiliary actuators 52 and 54 to permit the vehicle to proceed after it has been stopped and permit stopping of the vehicle under control of the auxiliary actuators 52 and 54 by reopening of the switch 110.

The invention may be embodied in other specific forms without departing from the spirit or essential characteristics thereof. The present embodiment is therefore to be considered in all respects as illustrative and not restrictive.

We claim:

1. Auxiliary and service brake apparatus for operating the brake of a wheeled vehicle, said brake apparatus comprising:
    a. a service brake system including a service brake actuator for selective activation and inactivation of the brake;
    b. an auxiliary brake actuator including mechanical means for activating the brake and pressure responsive means for selectively overriding the mechanical means; and
    c. a pressure control system, independent of said service brake system comprising:
        1. a source of actuating fluid,
        2. a pump,
        3. first conduit means serially interconnecting said source, said pump and said pressure responsive means of said auxiliary brake actuator,
        4. a control valve having opened and closed operative positions,
        5. second conduit means serially interconnecting said first conduit means intermediate said pump and said pressure responsive means, said control valve, and said source,
        6. means biasing said control valve to its open position for relieving pressure at said pressure responsive means and thereby permitting said mechanical means to activate the brake,
        7. electric valve control means for overriding said biasing means to close said control valve and thereby maintain at said pressure responsive means the pressure developed by said pump,
        8. and first electric circuit means connected to said electric valve control means for selective actuation thereof,
        9. said first electric circuit means including at least one switch responsive to an independent operating condition such that a predetermined change in said independent operating condition will open said switch and thereby automatically cause said biasing means to open said control valve and said mechanical means to activate the brake.

2. The apparatus defined in claim 1 wherein said first electrical circuit means includes a plurality of series connected switches responsive to independent operating conditions such that a predetermined change in any one of said independent operating conditions will open the respective switch and thereby automatically cause said biasing means to open said control valve and said mechanical means to activate the brake.

3. The apparatus defined in claim 2 wherein one of said switches is adapted to open in response to termination of operation of the prime mover of the vehicle.

4. The apparatus defined in claim 2 wherein one of said switches is manually operable.

5. The apparatus defined in claim 2 wherein one of said switches is adapted to open in response to a predetermined failure condition in said service brake system.

6. The apparatus defined in claim 2 wherein said service brake and auxiliary brake actuators are combined in a single actuator assembly.

7. The apparatus defined in claim 6 wherein said service brake system includes a hydraulically powered service actuator and wherein the actuating fluid in said pressure control system is hydraulic fluid.

8. The apparatus defined in claim 7 further comprising an electric motor for driving said pump and second electric circuit means including said series connected switches of said first electric circuit means connected to said electric motor for selective operation thereof, whereby a change in an operating condition resulting in opening of said control valve and activation of the brake will also assure that said electric motor and said pump are stopped.

9. The apparatus defined in claim 8 is further comprising one-way flow control valve means in said first conduit means on the discharge side of said pump for preventing reverse flow of hydraulic fluid therethrough when said pump is stopped, and said second electric circuit means including a further switch in series with said series connected switches of said first electric circuit means, said further switch being responsive to the pressure within said first conduit means downstream of said one-way flow control valve to open when said pressure exceeds a predetermined magnitude and close when said pressure falls below a predetermined magnitude.

10. The apparatus defined in claim 9 wherein one of said switches is adapted to open in response to termination of operation of the prime mover of the vehicle.

11. The apparatus defined in claim 9 wherein one of said switches is manually operable.

12. The apparatus defined in claim 9 wherein one of said switches is adapted to open in response to a predetermined failure condition in said service brake system.

PO-1050
(5/69)

UNITED STATES PATENT OFFICE
CERTIFICATE OF CORRECTION

Patent No. 3,582,150          Dated June 1, 1971

Inventor(s) WILLIAM J. WILLIAMS

It is certified that error appears in the above-identified patent and that said Letters Patent are hereby corrected as shown below:

Column 2, line 16, change "relive" to -- relieve --;

Column 2, line 44, after "closed" insert -- switch --;

Column 3, line 29, change "actuations" to -- actuators --;

Column 3, line 42, delete "contacts";

Column 4, line 38, before "The" insert -- 2 --.

Signed and sealed this 14th day of December 1971.

(SEAL)
Attest:

EDWARD M. FLETCHER, JR.      ROBERT GOTTSCHALK
Attesting Officer             Acting Commissioner of Patents